United States Patent
Deng et al.

(10) Patent No.: US 10,936,399 B2
(45) Date of Patent: Mar. 2, 2021

(54) SYSTEM AND METHOD FOR PERFORMING AUTOMATIC RECOVERY AFTER A SYSTEM HARD FAULT HAS OCCURRED IN A CONTROLLER OF AN OPTICAL COMMUNICATIONS MODULE

(71) Applicant: Foxconn Interconnect Technology Limited, Grand Cayman (KY)

(72) Inventors: Yong Mian Deng, Mountain View, CA (US); Matthew M. Bruensteiner, San Jose, CA (US)

(73) Assignee: Foxconn Interconnect Technology Limited, Grand Cayman (KY)

( * ) Notice: Subject to any disclaimer, the term of this patent is extended or adjusted under 35 U.S.C. 154(b) by 162 days.

(21) Appl. No.: 16/206,017

(22) Filed: Nov. 30, 2018

(65) Prior Publication Data
US 2020/0174877 A1 Jun. 4, 2020

(51) Int. Cl.
*G06F 11/07* (2006.01)

(52) U.S. Cl.
CPC ........ *G06F 11/0781* (2013.01); *G06F 11/076* (2013.01); *G06F 11/0724* (2013.01); *G06F 11/0757* (2013.01)

(58) Field of Classification Search
CPC ............. G06F 11/0757; G06F 11/0772; G06F 11/076; G06F 11/0781; G06F 11/0724; H04L 43/103; H04L 43/10
See application file for complete search history.

(56) References Cited

U.S. PATENT DOCUMENTS

| | | | |
|---|---|---|---|
| 7,334,167 B2 | 2/2008 | Stabrowski | |
| 7,424,666 B2 | 9/2008 | Chandwani et al. | |
| 7,681,089 B2 | 3/2010 | Ashmore | |
| 9,329,885 B2 * | 5/2016 | Lambert | G06F 9/45558 |

(Continued)

OTHER PUBLICATIONS

Renesas, "RL78 Family Renesas Microcontrollers Big Ideas for Every Space 2017.07", Specifications Booklet, 2017, pp. 1-63, Renesas Electronics Corporation, www.renesas.com.

*Primary Examiner* — Matthew M Kim
*Assistant Examiner* — Kurosu Risa Altaf
(74) *Attorney, Agent, or Firm* — Thomas Horstemeyer, LLP (57) ABSTRACT

An optical communications module performs automatic recovery from a system hard fault that occurs when a controller of the module detects a particular error. The controller outputs a heart beep signal having a preselected attribute from a first port thereof if an error check operation performed by the controller determines that an error has not occurred. A second port of the controller receives a chip reset signal from automatic control logic that is external to the controller. The automatic recovery logic monitors a first port thereof to determine whether the heart beep signal having the preselected attribute is present at or absent from the first port of the automatic recovery logic and outputs a chip reset signal from a second port of the automatic recovery logic to the second port of the controller. The chip reset signal output from the second port of the automatic recovery logic is in the first or second condition depending on whether the heart beep signal is present at or absent from, respectively, the first port of the automatic recovery logic.

19 Claims, 4 Drawing Sheets

(56) References Cited

U.S. PATENT DOCUMENTS

| | | | |
|---|---|---|---|
| 2015/0052340 A1* | 2/2015 | Fuks | G06F 9/4825 |
| | | | 713/1 |
| 2016/0121115 A1* | 5/2016 | Guillory | A61N 1/3787 |
| | | | 607/60 |
| 2016/0335149 A1* | 11/2016 | David | G06F 11/0757 |
| 2017/0123884 A1* | 5/2017 | Lai | G06F 13/00 |
| 2017/0195042 A1* | 7/2017 | Mun | H04B 10/03 |
| 2017/0269984 A1 | 9/2017 | Idapalapati et al. | |
| 2019/0227742 A1* | 7/2019 | Singhal | G06F 3/0607 |
| 2019/0278651 A1* | 9/2019 | Thornley | G06F 11/0787 |

* cited by examiner

SYSTEM AND METHOD FOR PERFORMING AUTOMATIC RECOVERY AFTER A SYSTEM HARD FAULT HAS OCCURRED IN A CONTROLLER OF AN OPTICAL COMMUNICATIONS MODULE

TECHNICAL FIELD OF THE INVENTION

The invention relates to optical communications modules and, more particularly, to a method and system for performing automatic recovery in a controller of an optical communications module after a system hard fault has occurred.

BACKGROUND OF THE INVENTION

In optical communications networks, optical communications modules (i.e., optical transceiver, transmitter and receiver modules) are used to transmit and receive optical signals over optical waveguides, which are typically optical fibers. An optical transceiver module includes a transmitter side and a receiver side. On the transmitter side, a light source, which is typically a laser light source, generates a light beam. An optical coupling system receives the light beam and optically couples the light beam onto an end face of an optical fiber. The optical coupling system typically includes one or more reflective, refractive and/or diffractive elements that couple the modulated light beam onto the end face of the optical fiber.

A light source driver circuit of the transmitter side outputs electrical drive signals that drive the light source. On the receiver side, optical signals passing out of the end face of the optical fiber are optically coupled by an optical coupling system onto an optical detector, such as a P-intrinsic-N (P-I-N) diode, for example, of the module. The optical detector converts the optical signal into an electrical signal. Receiver circuitry of the receiver side processes the electrical signal to recover the data.

The operations of an optical communications module are typically controlled by a controller that executes software and/or firmware computer instructions. The controller typically controls the light source driver circuit and the receiver circuitry and may also control an interface for communicating with devices that are external to the module. For example, the controller may generate control signals that cause the light source driver circuit to adjust the electrical drive signals that it outputs to the light source based on feedback signals indicating a measurement of the intensity of the optical signals produced by the light source. As another example, the controller may generate control signals that are delivered to automatic gain control (AGC) circuit of the receiver circuitry to adjust the gain of the AGC based on feedback signals received by the controller.

The controller is typically a microcontroller that includes a solid state memory device, such as, for example, a static random access memory (SRAM) device that stores data and computer instructions, including firmware that controls the operations of the microcontroller. Some microcontrollers used in optical communications modules encode data with parity bits and perform an SRAM parity check to determine whether a parity error has occurred that compromises the integrity of the data. When the microcontroller detects an SRAM parity error, the microcontroller typically performs a system hard fault. For safety reasons, when a system hard fault occurs, the SRAM is typically disabled, which prevents the firmware routines of the microcontroller from being executed. The microcontroller will remain in this disabled condition indefinitely, resulting in a degradation in the performance of the optical communications module. Furthermore, in this disabled condition, the microcontroller cannot inform the user of the cause of the system hard fault. The only option is for the user to perform an external module reset.

A need exists for a system and method for performing automatic recovery of a controller of an optical communications module after an SRAM parity error has occurred.

DETAILED DESCRIPTION OF AN ILLUSTRATIVE EMBODIMENT

Representative embodiments described herein are directed to an optical communications module having a controller that performs automatic recovery from a system hard fault that occurs when the controller detects a particular error. In accordance with a representative embodiment, the module comprises the controller and automatic recovery logic that is external to the controller. First and second ports of the controller are in communication with first and second ports, respectively, of the automatic control logic. The controller performs an error check operation that determines whether an error has occurred. The controller generates and outputs a heart beep signal having a preselected attribute from a first port of the controller if the error check operation determines that an error has not occurred. The second port of the controller receives a chip reset signal from the second port of the automatic recovery logic that is in a first or second condition. If the chip reset signal is in the second condition, chip reset circuitry of the controller performs a chip reset operation. The automatic recovery logic monitors the first port of the automatic recovery logic to determine whether the heart beep signal having the preselected attribute is present at or absent from the first port of the automatic recovery logic and places the chip reset signal in the second condition if the heart beep signal is absent.

A few representative embodiments of the system and method that provide such an EA solution will now be described with reference to FIGS. 1-4, in which like reference numerals represent like components, elements or features. It should be noted that features, elements or components in the figures are not intended to be drawn to scale, emphasis being placed instead on demonstrating inventive principles and concepts. It should be noted that the inventive principles and concepts are not limited to the representative embodiments described herein, as will be understood by those of skill in the art in view of the description provided herein.

In the following detailed description, for purposes of explanation and not limitation, exemplary, or representative, embodiments disclosing specific details are set forth in order to provide a thorough understanding of inventive principles and concepts. However, it will be apparent to one of ordinary skill in the art having the benefit of the present disclosure that other embodiments according to the present teachings that are not explicitly described or shown herein are within the scope of the appended claims. Moreover, descriptions of well-known apparatuses and methods may be omitted so as not to obscure the description of the exemplary embodiments. Such methods and apparatuses are clearly within the scope of the present teachings, as will be understood by those of skill in the art. It should also be understood that the word "example," as used herein, is intended to be non-exclusionary and non-limiting in nature.

The terminology used herein is for purposes of describing particular embodiments only, and is not intended to be limiting. The defined terms are in addition to the technical, scientific, or ordinary meanings of the defined terms as commonly understood and accepted in the relevant context.

The terms "a," "an" and "the" include both singular and plural referents, unless the context clearly dictates otherwise. Thus, for example, "a device" includes one device and plural devices. The terms "substantial" or "substantially" mean to within acceptable limits or degrees acceptable to those of skill in the art. The term "approximately" means to within an acceptable limit or amount to one of ordinary skill in the art.

The term "memory" or "memory device", as those terms are used herein, are intended to denote a non-transitory computer-readable storage medium that is capable of storing computer instructions, or computer code, for execution by one or more processors. References herein to "memory" or "memory device" should be interpreted as one or more memories or memory devices. The memory may, for example, be multiple memories within the same computer system. The memory may also be multiple memories distributed amongst multiple computer systems or computing devices.

A "processor," "processing device," or "processing logic," as those terms are used herein, are interchangeable and encompass at least one electronic device that is configured to perform one or more processing algorithms that process signals. The electronic device(s) may perform the algorithm(s) in hardware, software or firmware, or a combination thereof. References herein to a system comprising "a processor" or "a processing device" or "processing logic" should be interpreted as one or more processors or processing cores. The processor may, for instance, be a multi-core processor. A processor may also refer to a collection of processors within a single computer system or distributed amongst multiple computer systems. Instructions of a computer program can be performed by a single processor or by multiple processors that may be within the same device or that may be distributed across multiple devices. The term "controller," as that term is used herein, denotes an electronic device that comprises a processor, a processing device or processing logic, as those terms are defined herein.

Figure 1:
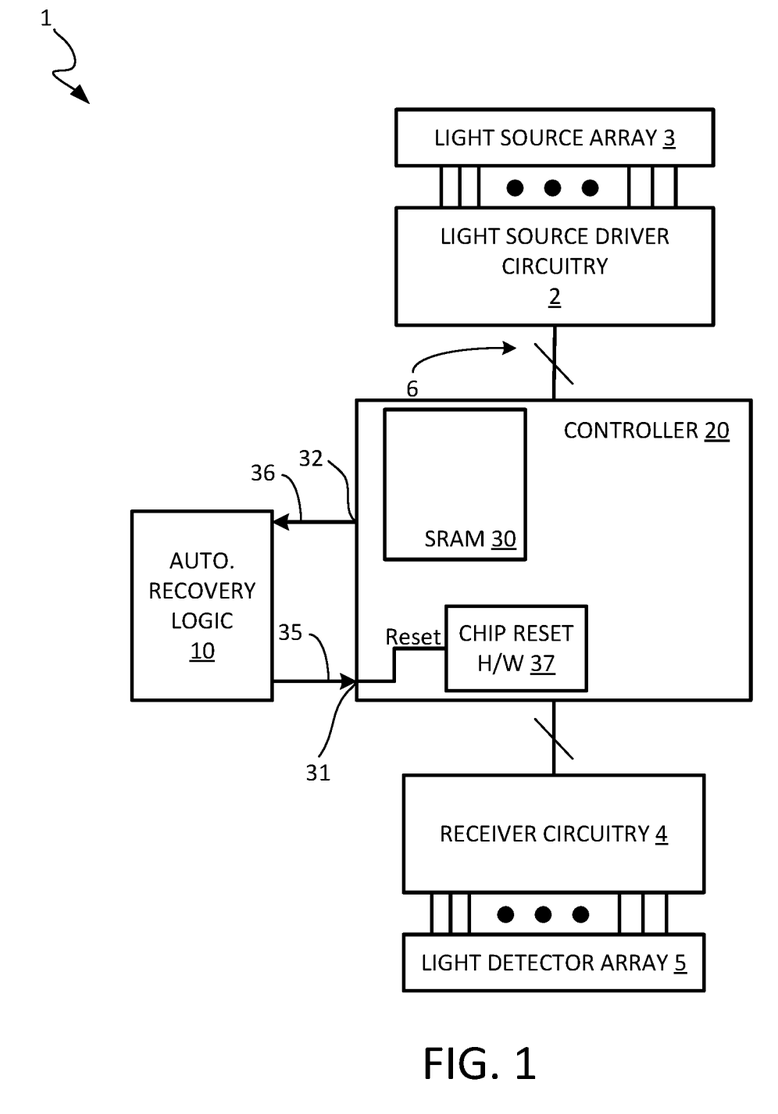
FIG. 1 is a block diagram of an optical communications module in accordance with a representative embodiment having automatic recovery logic that automatically resets a controller of the module after the controller has determined that a parity error has been detected.

FIG. 1 is a block diagram of an optical communications module 1 in accordance with a representative embodiment having automatic recovery logic 10 that automatically resets a controller 20 of the module 1 after the controller 20 has determined that a parity error has been detected. The optical communications module 1 may be an optical transceiver module, an optical transmitter module or an optical receiver module. The optical communications module 1 may have a variety of configurations, but typically includes, for example, the controller 20, light source driver circuitry 2, a light source array 3, receiver circuitry 4, and a light detector array 5. The light source array 3 has M light sources, where M is a positive integer that is greater than or equal to one. The light detector array 5 has N light detectors, where N is a positive integer that is greater than or equal to one. The M light sources may be, for example, M respective laser diodes (e.g., vertical cavity surface emitting lasers (VCSELs), edge-emitting laser diodes, etc.). The N light detectors may be, for example, N respective photodiodes (e.g., P-I-N diodes).

The light source driver circuitry 2 may have a variety of configurations, but typically is configured to deliver one or more drive signals 6 to the light source array 3. For example, if the light source(s) are VCSEL(s), then the driver circuitry 2 typically delivers modulation and bias current signals to each VCSEL. It is common in optical communication modules to use monitor photodiodes to monitor the intensity of the light generated by laser diodes and to use a controller that receives feedback signals from the monitor photodiodes and causes the driver circuitry to adjust the modulation and/or bias current signals being delivered to the laser diodes based on the monitored values. Although monitor photodiodes are not shown in FIG. 1, they may be included in the module 1 and monitored by the controller 20 to control the light source driver circuitry 2.

The receiver circuitry 4 may have a variety of configurations and components, but typically includes a receiver integrated circuit (IC), a clock and data recovery (CDR) circuit, a transimpedance amplifier (TIA), direct current (DC) offset cancelation circuitry and automatic gain control (AGC) circuitry. Some or all such components are typically controlled, at least in part, by the controller 20. For example, the controller 20 may set the initial gain values of the amplifier stages of the DC offset cancelation circuitry and of the AGC circuitry.

The controller 20 includes a solid state memory device 30 that stores computer instructions (e.g., firmware) executed by the controller 20 and may store various types of data. In accordance with this representative embodiment, the solid state memory device 30 is an SRAM device. In accordance with this representative embodiment, the controller 20 encodes bits to be stored in the SRAM device 30 with parity bits. A variety of parity bit encoding techniques are known that may be used for this purpose, as will be understood by those skilled in the art. The inventive principles and concepts are not limited with respect to the parity bit encoding technique that is used. As is known in the art, controllers used in optical communications modules use various bit error detection techniques to check for bit errors in order to maintain high integrity of the bits stored in SRAM devices of the controllers. In accordance with a representative embodiment, one or more of such bit error detection techniques are used by the controller 20 to detect errors of bits stored in the SRAM device 30. Thus, the controller 20 is configured to perform a parity bit encoding technique to encode bits stored in the SRAM device 30 with parity bits and to perform an error detection technique to determine whether a parity error has occurred.

As described above, when some known controllers used in known optical communications modules determine that a parity error has been detected, they issue a system hard fault that prevents them from performing any additional tasks. A "system hard fault," as that term is used herein, refers to a fault that occurs in a controller of an optical communications module that prevents the controller from performing additional operations, including the execution of firmware instructions. Such controllers remain in this disabled state until they receive an external reset signal at a particular pin of the controller IC chip package. For purposes of demonstrating representative embodiments according to the inventive principles and concepts, it will be assumed that the controller 20 is such a controller and that it is configured to receive a reset signal at the port 31 in FIG. 1. Thus, if the controller 20 did not include the automatic recovery logic 10, and detected the occurrence of an SRAM parity error, a user would have to make a manual section on the optical communications module 1 to cause the reset signal to be applied to port 31. Equipping the controller 20 with the automatic recovery logic 10 ensures that the controller 20 automatically recovers from the system hard fault via the reset signal 35 being automatically applied to port 31 in the event that the controller 20 determines that an SRAM parity error has occurred. The reset signal 35 causes chip reset hardware 37 of the controller 20 to perform a chip reset operation.

It should be noted that while the inventive principles and concepts are being described with reference to the detection of a parity error that results in the controller 20 performing a system hard fault, the inventive principles and concepts are equally applicable to automatically recovering from system hard faults performed in controllers when other types of errors are detected. For demonstrative purposes, the representative embodiments will be described with reference to detecting parity errors.

The controller 20 is configured to output a signal 36 having a preselected attribute from an output pin 32 of the main controller 20 to the automatic recovery logic 10 while the controller 20 is not detecting a parity error. The automatic recovery logic 10 monitors the signal 36 to determine whether it has the preselected attribute. As long as the automatic recovery logic 10 detects the preselected attribute, the reset signal 35 remains deasserted. If the automatic recovery logic 10 does not detect the preselected attribute, the automatic recovery logic 10 asserts the reset signal 35, which causes the chip reset hardware 37 of the controller 20 to perform an immediate chip reset.

The term "preselected attribute," as that term is used herein, means a characteristic that is attributable to the method by which the signal 36 is generated and that is recognizable by the automatic recovery logic 10. For example, the preselected attribute may be Q occurrences of a rising edge of the signal 36 within a preselected threshold time period, $P_{TH}$, where Q is a positive integer that is greater than or equal to one. In that example, if the automatic recovery logic 10 does not detect at least Q rising edges within $P_{TH}$, the automatic recovery logic 10 determines that the signal 36 is absent. As another example, the preselected attribute may be a preselected duty cycle for the signal 36 (i.e., the relative durations of the on time and off time of the signal 36). For example, the signal 36 may have a duty cycle of at least 10%, where the "cycle" corresponds to a series of job tasks contained in a job queue of the SRAM device 30. In that example, if the automatic recovery logic 10 does not detect a logic 1 level for at least 10% of the time that it takes the controller 20 to perform the tasks contained in the job queue, the automatic recovery logic 10 determines that the signal 36 is not present.

In the event that a parity error is detected by the controller 20, the controller 20 performs the aforementioned system hard fault, as is known in the art. As indicated above, when the controller 20 performs the system hard fault, it stops performing all tasks, including executing the firmware instructions stored in the SRAM device 30. In accordance with a preferred embodiment, the firmware instructions stored in the SRAM device 30 include one or more instructions, or a code segment, that causes the signal 36 having the preselected attribute to be output from output pin 32. Thus, when a parity error is detected resulting in the controller 20 halting execution of the firmware instructions stored in the SRAM device 30, the signal 36 having the preselected attribute is not outputted from the output port 32. The automatic recovery logic 10 monitors the signal output from port 32 and detects when the signal 36 having the preselected attribute is not present. If the automatic recovery logic 10 determines that the signal 36 output from port 32 is absent, e.g., that the preselected attribute has not been detected for a preselected period of time, the automatic recovery logic 10 sends the reset signal 35 to input port 31, causing the chip reset hardware 37 to perform a chip reset of the controller 20. The manner in which a chip reset operation is performed, the results of the operation and the hardware for performing the operation are well known, and therefore will not be described herein in the interest of brevity.

Figure 2:
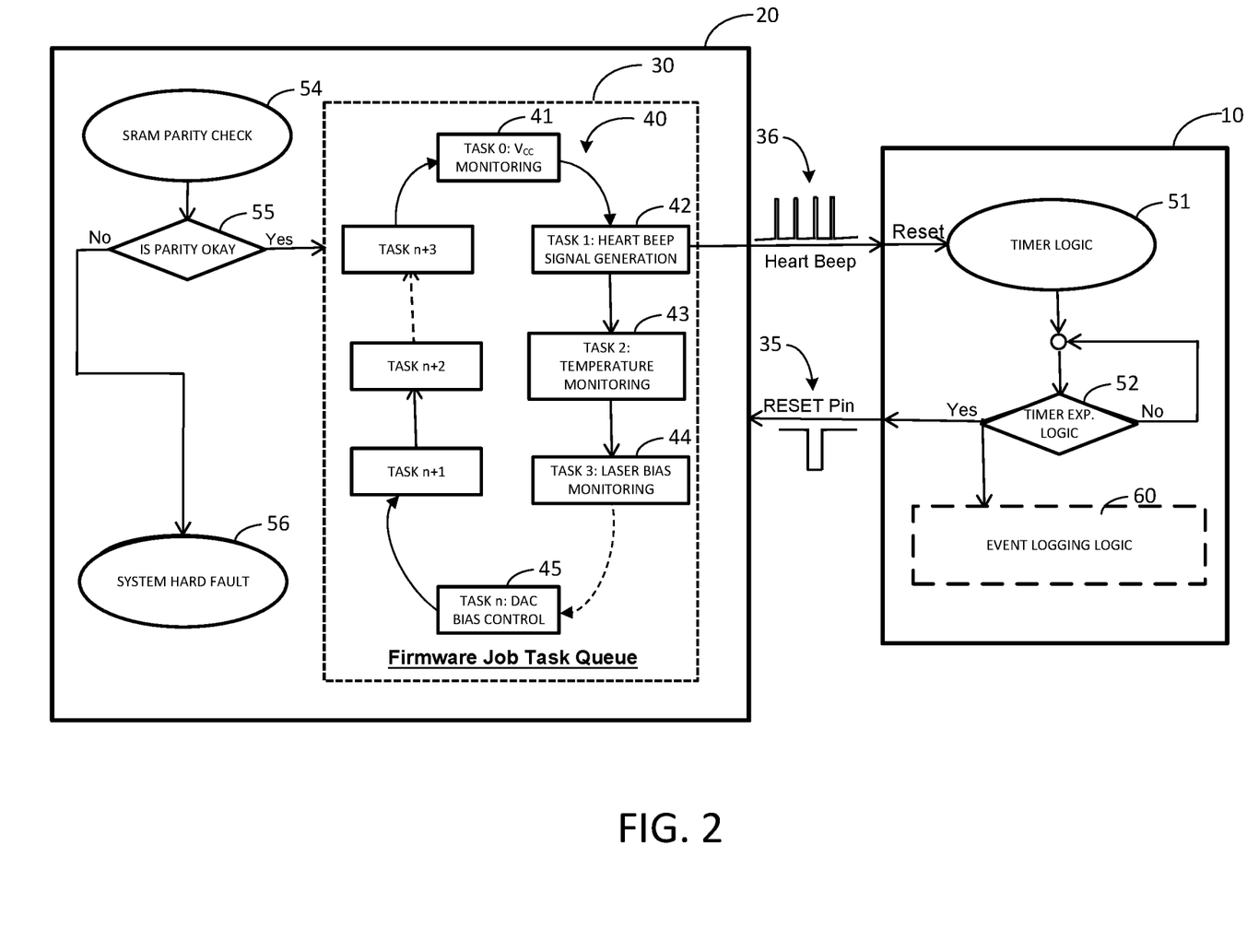
FIG. 2 is a block diagram of the controller and the automatic recovery logic shown in FIG. 1 in accordance with a representative embodiment in which the task associated with generating the signal having the preselected waveform is implemented in firmware stored in an SRAM device of the controller.

FIG. 2 is a block diagram of the controller 20 and the automatic recovery logic 10 shown in FIG. 1 in accordance with a representative embodiment in which the task associated with generating the signal 36 having the preselected attribute is implemented in firmware stored in the SRAM device 30. The SRAM device 30 includes a firmware job task queue 40 that holds firmware instructions in a preselected sequence for execution by the controller 20 in the preselected sequence. The controller 20 has one or more processors that are configured to perform various processing tasks, including execution of the tasks stored in the firmware job task queue 40. For exemplary purposes, the firmware job task queue 40 is shown as holding job tasks 0 through n+i, where n and i are positive integers. Examples of firmware job tasks 0 through n are shown as Vcc monitoring task 41, heart beep signal generator task 42, temperature monitoring task 43, laser bias monitoring task 44, and digital-to-analog converter (DAC) bias control task 45, respectively. The heart beep signal generator task 42 is firmware for generating the signal 36 having the preselected attribute, which is referred to hereinafter as the heart beep signal 36.

Figure 3:
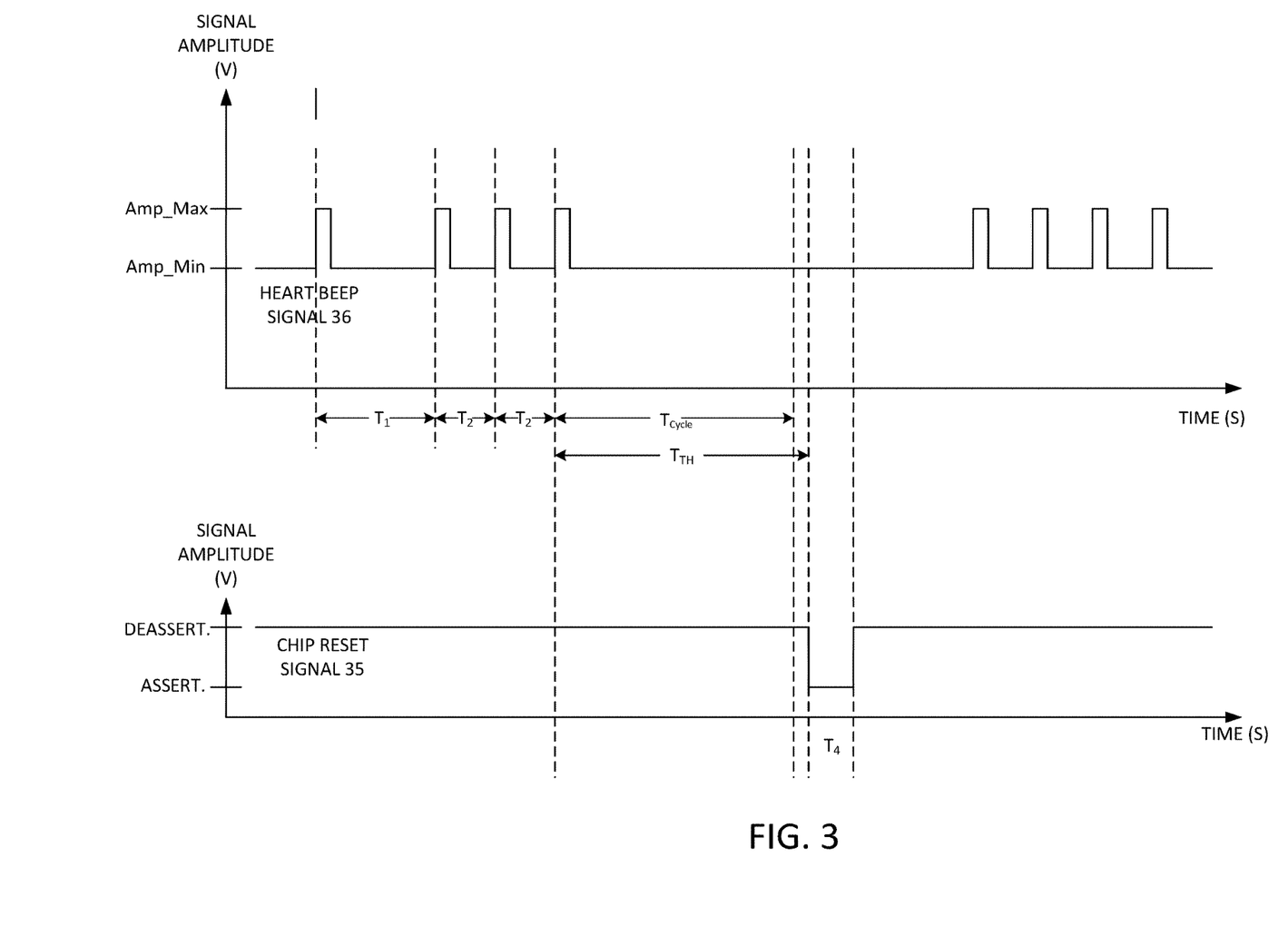
FIG. 3 is a timing diagram illustrating an example of the preselected waveform of the heart beep signal generated by the controller shown in FIG. 1 and an example of the reset signal generated by the automatic recovery logic shown in FIG. 1.

FIG. 3 is a timing diagram illustrating an example of the heart beep signal 36 generated by the controller 20 and an example of the reset signal 35 generated by the automatic recovery logic 10. In accordance with this representative embodiment, the heart beep signal 36 has a variable frequency and a variable period because it may not always take the same amount of time for the controller 20 to perform all of the tasks contained in the firmware job task queue 40. In accordance with this representative embodiment, the preselected attribute of the heart beep signal 36 is a rising edge from a minimum amplitude value, Amp_Min, to a maximum amplitude, Amp_Max, which may correspond to logic 0 and logic 1 levels, respectively, within a preselected threshold time period, $T_{TH}$, which, in accordance with this representative embodiment, is a time period slightly greater than the amount of time for one cycle, $T_{Cycle}$, of the firmware job task queue 40. Thus, $T_{TH}$ has a value that is slightly greater than the amount of time, $T_{Cycle}$, required for the controller 20 to perform all of the tasks contained in the queue 40.

In the example shown in FIG. 3, time periods $T_1$, $T_2$ and $T_3$ correspond to time periods that are smaller than the $T_{TH}$, and thus result in the automatic recovery logic 10 determining that the signal 36 is present. As long as the automatic recovery logic 10 detects the presence of the signal 36, it maintains the chip reset signal 35 in the deasserted state, as shown in FIG. 3. If the automatic recovery logic 10 detects the absence of the heart beep signal 36 for the preselected threshold time period $T_{TH}$, it generates the chip reset signal 35, which is received at the port 31 of the controller 20, thereby causing the chip reset hardware 37 to perform the chip reset operation. This preselected time period $T_{TH}$ is at least slightly greater than $T_{Cycle}$, as shown in FIG. 3 and may be R times $T_{Cycle}$, where R is greater than one. In some cases, R may be much greater than one, e.g., 2×, 10×, 100× $T_{TH}$. If the automatic recovery logic 10 does not detect a rising edge within the preselected threshold time period $T_{TH}$, the automatic recovery logic 10 asserts the reset signal 35 that is sent to port 31 of the controller 20. In accordance with this exemplary embodiment, the chip reset signal 35 remains deasserted (logic 1 level) as long as the automatic recovery logic 10 detects the presence of the heart beep signal 36, but then is asserted (logic level 0) for a period of time $T_4$ when the automatic recovery logic 10 detects the absence of the heart beep signal 36 for the time period $T_{TH}$.

The terms "asserted" and "deasserted" are being used in this example to denote logic 0 and logic 1 levels, respectively, of the chip reset signal 35, but they could instead be used to denote logic 1 and logic 0 levels, respectively, of the chip reset signal 35, as will be understood by those of skill in the art in view of the description provided herein.

With reference again to FIG. 2, in accordance with an exemplary embodiment, the automatic recovery logic 10 includes timer logic 51 configured to increment a count while the timer logic 51 is not detecting the presence of the heart beep signal 36. Each time the heart beep signal 36 is received, or detected, by the automatic recovery logic 10, the count of the timer logic 51 is reset to zero and then the count begins being incremented again. The automatic recovery logic 10 includes timer expiration logic 52 configured to determine whether the timer of the timer logic 51 has expired. The tasks performed by the timer logic 51 and by the timer expiration logic 52 may be implemented in a number of ways. For example, the timer logic 51 may be configured to set a particular register bit in the SRAM device 30 to 1 when the count reaches a value corresponding to $T_{TH}$ (i.e., timer expiration) and to set the register bit to 0 when the count is reset to 0, i.e., when the heart beep signal 36 is received by the automatic recovery logic 10. In that case, decision block 52 corresponds to the timer expiration logic 52 checking the value of the register bit each time the operation represented by block 51 is performed (e.g., each time the count is incremented) and determining whether the register bit is a 1 or a 0. If the timer expiration logic 52 determines that the register bit is a 1, indicating that the timer has expired, the automatic recovery logic 10 outputs the asserted reset signal 35 to port 31, thereby causing the chip reset hardware 37 to perform a chip reset operation.

Once the chip reset operation has been performed, the controller 20 resumes execution of the tasks contained in the firmware job task queue 40, including the heart beep signal generation task 42 that generates the heart beep signal 36. As indicated above, each time the timer logic 51 receives the heart beep signal 36, i.e., detects the presence of the preselected attribute of the heart beep signal, it restarts the timer by resetting the count to zero and resuming the incrementing of the count.

As indicated above, it is known that some controllers employed in optical communications modules include logic for performing SRAM parity checks to determine if a parity error has occurred, and if so, issuing a system hard fault. Block 54-56 in FIG. 2 represent the processes of determining whether an SRAM parity error has occurred, and if so, issuing a system hard fault. Since these processes are known and outside the scope of this disclosure, a detailed discussion of the manner in which they are performed is not provided herein in the interest of brevity.

At blocks 54 and 55, the controller 20 performs the SRAM parity check and determines whether an SRAM parity error has been detected, respectively. If a determination is made at block 55 that parity is okay, i.e., that a parity error has not been detected, the tasks contained in the firmware job task queue 40 continue to be performed, which means that the timer logic 51 continues to reset and restart the timer. If a determination is made at block 55 that parity is not okay, i.e., that a parity error has been detected, the controller 20 performs the system hard fault represented by block 56. When this occurs, the tasks contained in the firmware job task queue 40 cease being performed, which means that the timer logic 51 continues incrementing the counter, resulting in the timer expiring and the timer expiration logic 52 causing the automatic recovery logic 10 to assert the reset signal 35 sent to port 31, thereby causing the chip reset hardware 37 to perform a chip reset operation.

One of the advantages of implementing the task 42 of generating the heart beep signal 36 in the firmware of the controller 20 is that it allows modifications to be made to the task by making changes to the firmware rather than to the hardware, which would require redesigning the controller 20 and mass production of the new controllers. For example, if it is desirable or necessary to modify the duty cycle of the signal 36, such modifications can be made relatively easily by adding or modifying the tasks that are stored in the firmware job task queue 40. It should be noted, however, that the task of generating the heart beep signal 36 may be performed in firmware, software, hardware, or a combination thereof. The manner in which this task is implemented can depend on a variety of factors, as will be understood by those of skill in the art in view of the description provided herein.

Another advantage of the system and method is that they enable logging of parity events. In accordance with a representative embodiment, the automatic recovery logic 10 includes optional event logging logic 60 that is configured to log information about the timing of parity events. In accordance with this representative embodiment, each time the timer expiration logic 52 makes a determination that the timer has expired, i.e., that the heart beep signal 36 is no longer being detected by the automatic recovery logic 10, the event logging logic 60 records an entry indicative of the timing of the parity error. This provides diagnostic information about when the parity error occurred and when the chip reset operation occurred. This information is useful in determining the cause of the parity error. With the known controller discussed above, the user is required to manually reset the controller when the parity event is detected and the user is left guessing regarding the cause of the parity error and when the error occurred. Including the event logging logic 60 in the automatic recovery logic 10 of optical communications module 1 makes the information available for diagnostic and other purposes.

For example, it has been determined that a known controller used in a known optical communications module was detecting a parity error, but the source of the error was not readily identifiable. After investigation, it was determined that the particular parity error was the result of a proton or neutron attack that was causing a single bit in the SRAM device of the controller to change state. Although the parity error was detected, a significant amount of investigation was needed to determine the cause of the error. Furthermore, the error led to a system hard fault from which the controller could not automatically recover. The system and method disclosed herein provide solutions to these problems.

Preferably, the automatic recovery logic 10 is a device that is external to the controller 20. The automatic recovery logic 10 may be, for example, a microcontroller. A microcontroller used for this purpose may be a relatively simple microcontroller as it would only need a pin for monitoring the heart beep signal 36 and a pin for outputting the reset signal 35, although it could have additional pins for performing additional operations. The functionality associated with the operations of blocks 51, 52 and 60 is not very complicated, and thus the microcontroller used for this purpose could be relatively inexpensive, which is very important for meeting budget constraints in the optical communications module industry. Other types of processing devices may be used for this purpose, including, for example, an application specific integrated circuit (ASIC), a digital signal processor (DSP), a microprocessor, a programmable logic array (PLA), a programmable gate array (PGA). The automatic recovery logic 10 may be implemented in hardware, software and/or firmware, or a combination thereof.

The optional event logging logic 60 may record information in a memory element that is an integral part of the automatic recovery logic 10 or it may output the information from the automatic recovery logic 10 to an external device for storage in some other external memory device (not shown). For example, the information may be recorded in memory inside of the controller 20.

Although the automatic recovery logic 10 is external to the controller 20, the automatic recovery logic 10 and the controller 20 may be part of the same IC chip. The automatic recovery logic 10 and the controller 20 are typically implemented as separate IC chips that are electrically interconnected via a few input/output (I/O) pins of each chip.

Figure 4:
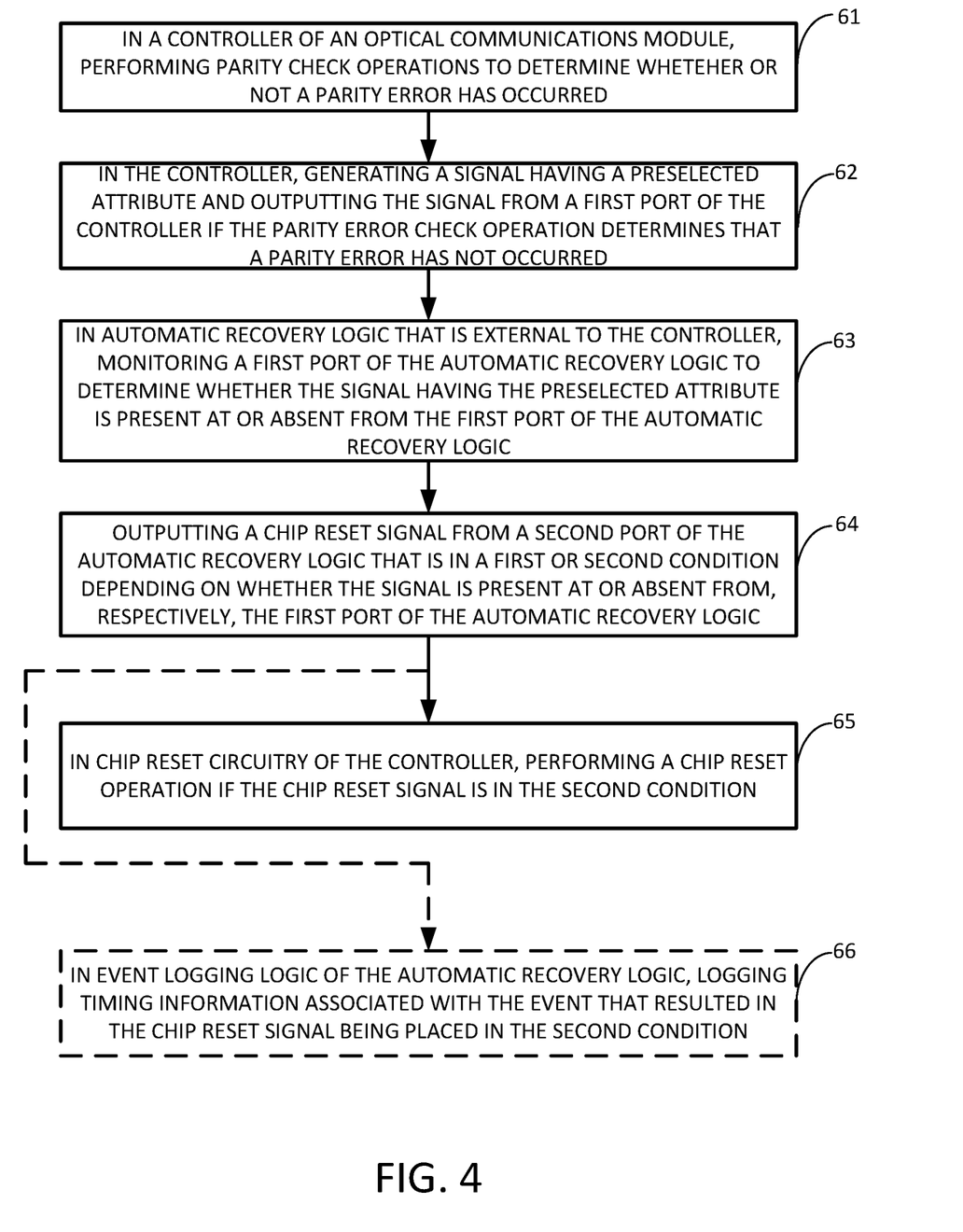
FIG. 4 is a flow diagram representing the method in accordance with a representative embodiment.

FIG. 4 is a flow diagram representing the method in accordance with a representative embodiment for performing automatic recovery from a system hard fault that is performed when an error check operation determines that an error has occurred. For demonstrative purposes, the method will be described with reference to FIGS. 1 and 2, but it should be understood that the method is not limited to being performed using the configurations of the controller 20 and of the automatic recovery logic 10 shown in FIGS. 1 and 2. In other words, controller and automatic recovery logic configurations other than those shown in FIGS. 1 and 2 may be used to perform the method. For demonstrative purposes, the method represented by the flow diagram of FIG. 4 will be described with reference to recovering from a system hard fault that is performed when a parity check operation determines that a parity error has occurred. It should be noted, however, that the inventive principles and concepts apply to other types of errors and error check operations that lead to system hard faults.

Block 61 represents the process of a controller (e.g., controller 20) of an optical communications module performing a parity error check operation to determine whether or not a parity error has occurred. Block 62 represent the process of the controller generating a signal having a preselected attribute and outputting the signal from a first port thereof (e.g., port 32) if the parity check operation determines that a parity error has not occurred. The parity check operation is typically performed in hardware of the controller, whereas the operations associated with generating and outputting the signal having the preselected attribute are typically performed in firmware of the controller (e.g., block 42 of the firmware job task queue 45). Block 63 represents the process of automatic recovery logic (automatic recovery logic 10) that is external to the controller monitoring a first port of the automatic recovery logic to determine whether the signal having the preselected attribute is present at or absent from the first port of the automatic recovery logic. Block 64 represents the process of the automatic recovery logic outputting a chip reset signal from a second port of the automatic recovery logic that is in a first condition (e.g., deasserted) or second condition (e.g., asserted) depending on whether the signal having the preselected attribute is present at or absent from, respectively, the first port of the automatic recovery logic.

As indicated above, if the controller detects a parity error, it stops outputting the signal having the preselected attribute, and the absence of the preselected attribute is detected by the automatic control logic, which causes it to assert the chip reset signal. The chip reset hardware receives the chip reset signal and performs a chip reset operation when the chip reset signal changes from the first condition (e.g., deasserted) to the second condition (e.g., asserted), as indicated by block 65.

The flow diagram of FIG. 4 also includes the optional process 66 of performing event logging with the event logging logic (e.g., logic 60) when the timer runs out indicating that a parity error has been detected in the controller. In accordance with this embodiment, placing the chip reset signal in the second condition (e.g., asserted) triggers the logging of the event information by the event logging logic.

There are a number of ways in which the automatic recovery logic 10 and the controller 20 can be configured to perform the tasks described above. As indicated above, the signal 36 can be generated to have a variety of preselected attributes, and so the processes associated with generating the signal 36 and detecting the presence of the signal 36 can also vary. Persons of skill in the art will understand, in view of the description provided herein, that many modifications can be made to the system and method described above that are within the scope of the inventive principles and concepts.

It should be noted that the invention has been described with reference to a few representative embodiments for the purposes of demonstrating the principles and concepts of the invention. For example, while the representative embodiments have been described with reference to particular configurations and implementation scenarios for the controller 20 and automatic recovery logic 10, other configurations and implementation scenarios are possible, as will be understood by those of skill in the art in view of the description provided herein. Therefore, the inventive principles and concepts are not limited to the representative embodiments described herein, as will be understood by persons of ordinary skill in the art in view of the description provided herein. Those skilled in the art will understand that many modifications may be made to the embodiments described herein and that all such modifications are within the scope of the disclosure.

What is claimed is:

1. An optical communications module that performs automatic recovery from a system hard fault, the module comprising:
a first controller that performs an error check operation to determine whether an error has occurred and that performs a system hard fault if a determination is made that an error has occurred, the first controller comprising a task queue in which computer code corresponding to a plurality of tasks to be performed by the first controller is stored, and wherein when a hard system fault is performed by the first controller, the first controller ceases performing the tasks until after a chip reset operation is performed by the first controller, at least one of the tasks performed by the first controller causing the first controller to generate a heart beep signal having a preselected attribute and to output the heart beep signal from a first port of the first controller, the first controller having a second port that receives a chip reset signal, the chip reset signal being in one of a first condition and a second condition, wherein if the chip reset signal is in the second condition, chip reset circuitry of the first controller performs said chip reset operation; and automatic recovery logic that is external to the first controller and that has first and second ports that are in communication with the first and second ports of the first controller, respectively, the automatic recovery logic monitoring the first port of the automatic recovery logic to determine whether the heart beep signal having the preselected attribute is present or absent at the first port of the automatic recovery logic and outputting the chip reset signal from the second port of the automatic recovery logic to the second port of the first controller, wherein the chip reset signal output from the second port of the automatic recovery logic is in the first or second condition depending on whether the heart beep signal having the preselected attribute is present or absent, respectively, at the first port of the automatic recovery logic.

2. The optical communications module of claim 1, wherein the error check operation performed by the first controller is a parity error check operation that determines whether a parity error has occurred.

3. The optical communications module of claim 2, wherein the first controller includes first processing logic and a memory device, the first processing logic being configured to perform said plurality of tasks.

4. The optical communications module of claim 3, wherein the automatic recovery logic has second processing logic configured to monitor the first port of the automatic recovery logic to determine whether the heart beep signal having the preselected attribute is present or absent at the first port of the automatic recovery logic and to output the chip reset signal from the second port of the automatic recovery logic.

5. The optical communications module of claim 4, wherein the memory device of the first controller is a static random access memory (SRAM) device.

6. The optical communications module of claim 5, wherein the first controller is a first microcontroller integrated with the SRAM device on a first chip.

7. The optical communications module of claim 6, wherein the automatic recovery logic is logic of a second microcontroller, the first and second ports of the first microcontroller corresponding to first and second pins, respectively, of the first microcontroller, the first and second ports of the automatic recovery logic corresponding to first and second pins, respectively, of the second microcontroller, the second pin of the first microcontroller being a reset pin of the first microcontroller.

8. The optical communications module of claim 4, wherein the first processing logic comprises the job task queue, the computer code comprising firmware, and wherein said at least one of the tasks comprises a segment of firmware computer code contained in the task queue.

9. The optical communications module of claim 4, wherein the second logic includes timer logic and timer expiration logic, the timer logic monitoring the first port of the automatic recovery logic and starting a timer if the heart beep signal having the preselected attribute is absent from the first port of the automatic recovery logic, the timer expiration logic determining when the timer has expired and changing the chip reset signal from the first condition to the second condition when the timer expires.

10. The optical communications module of claim 9, wherein the second logic further includes event logging logic that logs an indication of when the timer expires.

11. The optical communications module of claim 1, wherein the automatic recovery logic includes event logging logic that logs an indication of when the automatic recovery logic determines that the heart beep signal having the preselected attribute is absent from the first port of the automatic recovery logic.

12. A method for performing automatic recovery from a system hard fault in an optical communications module, the method comprising:

in a first controller of the optical communications module, performing an error check operation that determines whether or not an error has occurred and that performs a system hard fault if a determination is made that an error has occurred, the first controller comprising a task queue in which computer code corresponding to a plurality of tasks to be performed by the first controller is stored, and wherein when a hard system fault is performed by the first controller, the first controller ceases performing the tasks until after a chip reset operation is performed by the first controller, at least one of the tasks performed by the first controller causing a heart beep signal having a preselected attribute to be generated and output from a first port of the first controller;

in automatic recovery logic of the module that is external to the first controller and that has a first port that is in communication with the first port of the first controller, monitoring the first port of the automatic recovery logic to determine whether the heart beep signal having the preselected attribute is present or absent at the first port of the automatic recovery logic;

in the automatic recovery logic, outputting a chip reset signal from a second port of the automatic recovery logic to a second port of the first controller, wherein the chip reset signal is in a first or second condition depending on whether the heart beep signal is present or absent, respectively, at the first port of the automatic recovery logic; and with chip reset circuitry of the first controller, performing the chip reset operation if the chip reset signal received at the second port of the first controller is in the second condition.

13. The method of claim 12, wherein the error check operation performed by the first controller is a parity error check operation that determines whether a parity error has occurred.

14. The method of claim 13, wherein the first controller comprises first processing logic that comprises the task queue, the computer code comprising firmware, and wherein said at least one of the tasks is implemented in firmware computer code contained in the queue and executed by the first processing logic.

15. The method of claim 13, wherein the automatic recovery logic includes timer logic and timer expiration logic, the timer logic monitoring the first port of the automatic recovery logic and starting a timer if the heart beep signal having the preselected attribute is absent from the first port of the automatic recovery logic, the timer expiration logic determining when the timer has expired and changing the chip reset signal from the first condition to the second condition when the timer expires.

16. The method of claim 15, further comprising:
with event logging logic of the automatic recovery logic, logging an indication of when the timer expires.

17. The method of claim 12, further comprising:
with event logging logic of the automatic recovery logic, logging an indication of when the automatic recovery logic determines that the heart beep signal having the preselected attribute is absent from the first port of the automatic recovery logic.

18. A computer program for performing automatic recovery from a system hard fault after a controller of an optical communications module performs an error check operation that determines that an error has occurred and performs the system hard fault, wherein when the controller performs the system hard fault, the controller ceases performing tasks stored in a task queue of the controller until after a chip reset operation is performed by the controller, the computer program comprising computer code stored on a non-transitory computer-readable medium comprising:

a first code segment stored in the task queue, the first code segment corresponding to one of the tasks stored in the task queue, wherein when the first code segment is performed by first logic of the controller, the first logic causes a heart beep signal having a preselected attribute to be generated and output from a first port of the controller, wherein automatic recovery logic of the module that is external to the controller and that has a first port that is in communication with the first port of the controller monitors the first port of the automatic recovery logic to determine whether the heart beep signal having the preselected attribute is present or absent at the first port of the automatic recovery logic, and wherein the automatic recovery logic outputs a chip reset signal from a second port of the automatic recovery logic to a second port of the controller, the chip reset signal being in a first or second condition depending on whether the heart beep signal having the preselected attribute is present at or absent from, respectively, the first port of the automatic recovery logic, and wherein chip reset circuitry of the controller performs the chip reset operation if the chip reset signal received at the second port of the controller is in the second condition.

19. The non-transitory computer-readable medium of claim 18, wherein the error check operation is a parity error check operation that determines whether a parity error has occurred.

* * * * *